(12) United States Patent
Arvidson et al.

(10) Patent No.: US 11,743,173 B2
(45) Date of Patent: Aug. 29, 2023

(54) INDEPENDENT REDUNDANT PATH DISCOVERY FOR BLUETOOTH MESH

(71) Applicant: Telefonaktiebolaget LM Ericsson (publ), Stockholm (SE)

(72) Inventors: Pontus Arvidson, Sollentuna (SE); Piergiuseppe Di Marco, Teramo (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 227 days.

(21) Appl. No.: 17/263,324

(22) PCT Filed: Nov. 16, 2018

(86) PCT No.: PCT/EP2018/081597
§ 371 (c)(1),
(2) Date: Jan. 26, 2021

(87) PCT Pub. No.: WO2020/035159
PCT Pub. Date: Feb. 20, 2020

(65) Prior Publication Data
US 2021/0168066 A1 Jun. 3, 2021

Related U.S. Application Data

(60) Provisional application No. 62/719,247, filed on Aug. 17, 2018.

(51) Int. Cl.
*H04L 45/00* (2022.01)
*H04W 40/02* (2009.01)
*H04W 84/18* (2009.01)

(52) U.S. Cl.
CPC ............ *H04L 45/22* (2013.01); *H04W 40/02* (2013.01); *H04W 84/18* (2013.01)

(58) Field of Classification Search
None
See application file for complete search history.

(56) References Cited

U.S. PATENT DOCUMENTS

| 2005/0030921 | A1  | 2/2005 | Yau |
| 2007/0127379 | A1* | 6/2007 | Gossain ................. H04L 45/22 370/235 |

(Continued)

FOREIGN PATENT DOCUMENTS

| CN | 1731760 A   | 2/2006 |
| CN | 101193020 A | 6/2008 |

(Continued)

OTHER PUBLICATIONS

Barange, Manish Y., et al., "Review Paper On Implementation Of Multipath Reactive Routing Protocol In MANET", International Conference on Electrical, Electronics, and Optimization Techniques (ICEEOT), 2016, pp. 227-231.

(Continued)

*Primary Examiner* — Brian S Roberts
(74) *Attorney, Agent, or Firm* — Murphy, Bilak & Homiller, PLLC

(57) ABSTRACT

A method for establishing redundant paths between a source node and the destination node, source node and a destination node in a wireless mesh network, said method comprising the steps of establishing, by said source node, a first path between said source node and said destination node, wherein said first path is associated with a first sequence number and comprises one or more first intermediate nodes in said wireless mesh network; determining, by said source node, to establish a second path between said source node and said destination node; transmitting, by said source node, a path request to a plurality of nodes in said wireless mesh network, wherein said path request identifies said destination node and that said requested second path is redundant to said first (Continued)

path; and said path request is transmitted no earlier than a predetermined duration after said first path is established; receiving, by said source node, from said destination node, a path reply that identifies said second path, wherein said second path comprises one or more second intermediate nodes, and wherein said one or more second intermediate are exclusive of said one or more first intermediate nodes. Complimentary methods and devices for establishing redundant paths in a wireless mesh network are also presented herein.

21 Claims, 7 Drawing Sheets

(56) References Cited

U.S. PATENT DOCUMENTS

| | | | |
|---|---|---|---|
| 2009/0135824 A1 | 5/2009 | Liu | |
| 2009/0228575 A1* | 9/2009 | Thubert | H04L 45/64 709/220 |
| 2010/0303005 A1* | 12/2010 | Gossain | H04L 45/124 370/328 |
| 2012/0327792 A1* | 12/2012 | Guo | H04W 40/02 370/252 |
| 2013/0250808 A1* | 9/2013 | Hui | H04W 40/023 370/255 |
| 2017/0311226 A1* | 10/2017 | Fuhrmann | H04L 45/02 |
| 2018/0176119 A1* | 6/2018 | Abdallah | H04B 7/0413 |
| 2018/0176123 A1* | 6/2018 | Abdallah | H04L 45/22 |
| 2018/0234907 A1* | 8/2018 | Abdallah | H04L 67/104 |

FOREIGN PATENT DOCUMENTS

| | | |
|---|---|---|
| CN | 101335701 A | 12/2008 |
| CN | 102036337 A | 4/2011 |
| CN | 102170660 A | 8/2011 |
| CN | 102227151 A | 10/2011 |
| CN | 104320334 A | 1/2015 |
| CN | 104754688 A | 7/2015 |
| CN | 106922008 A | 7/2017 |
| RU | 2628334 C2 | 8/2017 |
| WO | 2009107962 A2 | 9/2009 |

OTHER PUBLICATIONS

Fajun, Chen, "Research on Multi-path Routing Technologies for Wireless Mesh Networks", A dissertation submitted in partial fulfillment of the requirements for the degree of Doctor of Eng. in Computer Science and Tech Graduate School of National University of Defense Technology Changsha, Hunan, P. R. China, Sep. 2011, pp. 1-159, English Abstract Attached.

Blutooth, "Bluetooth Core Specification", Bluetooth SIG Proprietary, Version 5.0, vols. 1-7, Dec. 6, 2016, pp. 1-2822.

Heydon, Robin, et al., "Mesh Model", Bluetooth Specification; v1.0; Mesh Working Group, Jul. 13, 2017, pp. 1-314.

Perkins, C., et al., "Ad hoc On-Demand Distance Vector (AODV) Routing", Network Working Group; Request for Comments: 3561; Category: Experimental, Jul. 2003, pp. 1-37.

"Mesh Profile", Bluetooth Specification, Revision V. 1.0., Mesh Working Group, Jul. 13, 2017, pp. 1-331.

Woolley, Martin, "Bluetooth Mesh Networking: An Introduction for Developers", Bluetooth, https://www.bluetooth.com/bluetooth-resources, 2017 Bluetooth SIG Proprietary, 2017, pp. 1-28.

* cited by examiner

```
┌─────────────────────────────────────────────────────────────────────┐
│ Establishing a first path between the source node and the destination node, │
│ wherein the first path is associated with a first sequence number and       │
│ comprises one or more intermediate nodes in the wireless mesh network.      │
│                                  1010                                        │
└─────────────────────────────────────────────────────────────────────┘
                                    ↓
┌─────────────────────────────────────────────────────────────────────┐
│ Receiving, from the source node via one or more of the intermediate nodes,  │
│ a plurality of path requests to establish a second path between the source  │
│ node and the destination node, wherein: each of the path requests identifies│
│ that the requested second path is redundant to the first path; each of the  │
│ path requests is associated with a candidate second path that is different  │
│ than the candidate second paths associated with all other of the path       │
│ requests; and all intermediate nodes comprising the respective second       │
│ candidate paths are exclusive of the one or more first intermediate nodes.  │
│                                  1020                                        │
└─────────────────────────────────────────────────────────────────────┘
                                    ↓
┌─────────────────────────────────────────────────────────────────────┐
│ Selecting the second path from among the candidate of second paths           │
│                                  1030                                        │
└─────────────────────────────────────────────────────────────────────┘
                                    ↓
┌─────────────────────────────────────────────────────────────────────┐
│ Transmitting, to the source node, a path reply identifying the second path  │
│                                  1040                                        │
└─────────────────────────────────────────────────────────────────────┘
                                    ↓
┌─────────────────────────────────────────────────────────────────────┐
│ Updating a routing table to identify the first path and the second path     │
│                                  1050                                        │
└─────────────────────────────────────────────────────────────────────┘
                                    ↓
┌─────────────────────────────────────────────────────────────────────┐
│ Exchanging data messages with the destination node via the first path and   │
│                            the second path                                   │
│                                  1060                                        │
└─────────────────────────────────────────────────────────────────────┘
```

Fig. 6

INDEPENDENT REDUNDANT PATH DISCOVERY FOR BLUETOOTH MESH

TECHNICAL FIELD

The present disclosure generally relates to wireless telecommunication networks, and more specifically to improvement to forwarding of data messages in mesh networks, such as Bluetooth mesh networks.

BACKGROUND

Bluetooth™ refers generally to a standardized group of technologies usable to exchange data between devices over short distances using radio transmission and reception in the 2.4-GHz ISM band. The promulgation and management of Bluetooth standards is done by various committees of the Bluetooth SIG, of which over 30,000 companies are members.

Bluetooth Low Energy, BLE, is a particular version of Bluetooth technology that was first standardized by the Bluetooth Special Interest Group, SIG, in 2010. BLE is generally targeted at low power applications that can tolerate lower-rate communications than for example, more traditional Bluetooth applications. Furthermore, BLE is suitable for inexpensive devices that are constrained in terms of memory and computational resources.

Even so, BLE leverages a robust frequency-hopping spread spectrum approach that transmits data over 40 channels. Furthermore, a BLE-compliant radio includes multiple physical layer, PHY, options that support data rates from 125 kb/s to 2 Mb/s, multiple power levels, from 1 mW to 100 mW, as well as multiple security options.

BLE also supports multiple network topologies, including a conventional point-to-point topology used for establishing one-to-one (1:1) communications between two devices. In addition, BLE supports a broadcast (one-to-many, or 1:m) device communications. The broadcast topology can be used for localized information sharing and for location services such as retail point-of-interest information, indoor navigation and wayfinding, and item/asset tracking.

Finally, BLE supports a mesh topology that can be used for establishing many-to-many (m:m) device communications. The mesh topology based on BLE can enable the creation of large-scale device networks such as for control, monitoring, and automation systems where tens, hundreds, or thousands of devices need to reliably and securely communicate with each other. In the BLE mesh topology, each device in a mesh network potentially can communicate with every other device in the mesh network. Communication is achieved using messages, and devices can relay messages to other devices so that the end-to-end communication range is extended far beyond the radio range of each individual device.

Devices that are part of a BLE mesh network are referred to as "nodes" whereas other devices not part of the mesh, even though within range of the mesh, are referred to as "un-provisioned devices." The process which transforms an un-provisioned device into a node is called provisioning. This is a secure procedure which results in an un-provisioned device possessing a series of encryption keys and being known to the Provisioner device, such as a tablet or smartphone. A Provisioner is a device responsible for adding a node to a network and configuring its behaviour.

As mentioned above, communication in a Bluetooth mesh network is "message oriented" and various message types are defined. For example, when a node needs to query the status of other nodes or needs to control other nodes in some way, it can send a message of a suitable type. If a node needs to report its status to other nodes, it can send a message of suitable type. Messages must be sent from an address and to an address. Bluetooth mesh topology supports three different types of addresses. A unicast address uniquely identifies a single element (e.g., devices can include one or more elements), and unicast addresses are assigned to devices during the provisioning process. A group address is a multicast address which represents one or more elements. A virtual address may be assigned to one or more elements, spanning one or more nodes.

To further facilitate the use of BLE in mesh topologies, the Bluetooth SIG promulgated the Mesh Profile Specification in July 2017. A layered mesh architecture based on BLE comprises, among others, the Model layer, which defines models used to standardize the operation of typical user scenarios, such as models for lighting and sensors. The Model layer is further defined in other Bluetooth specifications, including a Bluetooth Mesh Model specification. The Foundation Model layer defines the states, messages, and models required to configure and manage a mesh network. The Access layer defines how higher-layer applications can use the upper transport layer. It defines the format of the application data; it defines and controls the application data encryption and decryption performed in the upper transport layer; and it checks whether the incoming application data has been received in the context of the right network and application keys before forwarding it to the higher layer.

The Transport layer is subdivided into the Upper and Lower Transport Layers. The Upper Transport Layer encrypts, decrypts, and authenticates application data and is designed to provide confidentiality of access messages. It also defines how transport control messages are used to manage the upper transport layer between nodes, including when used by the "Friend" feature. The Lower Transport Layer defines how upper transport layer messages are segmented and reassembled into multiple Lower Transport Protocol Data Units, PDUs, to deliver large upper transport layer messages to other nodes. It also defines a single control message to manage segmentation and reassembly.

The Network Layer defines how transport messages are addressed towards one or more elements. It defines the network message format that allows Transport PDUs to be transported by the bearer layer. The network layer decides whether to relay/forward messages, accept them for further processing, or reject them. It also defines how a network message is encrypted and authenticated. The bearer layer defines how network messages are transported between nodes. There are two bearers defined, the advertising bearer and the GATT bearer.

At the bottom of the exemplary architecture described are the BLE radio layers. The BLE physical, PHY, and link layers, are typically implemented in the Bluetooth controller. The layers above link layer typically can be implemented on the Bluetooth host device.

Currently, Bluetooth mesh networking is based on "flooding" which uses broadcasting over a set of shared channels—the advertising channels. A node acting as a relay node in a Bluetooth mesh network scans for mesh messages. When a message is detected and received by a node, the node checks if it is the destination of the message. The message can be forwarded in the mesh network by re-transmitting it so that the neighbours of the node can receive it. By means of this distributed mechanism the message is forwarded from node to node(s) in the network so that the message arrives at the destination.

Flooding, as specified in version 1.0 of the Bluetooth mesh specification, has some drawbacks including increased interference and energy consumption, especially as the level of traffic in the network increases. As such, subsequent versions of the Bluetooth mesh specifications are expected to implement mechanisms to limit packet forwarding to occur only along specific paths towards the intended receiver(s). This is expected to reduce the amount of traffic in directions where forwarding does not help improving the probability of successful delivery.

One known technique to construct forwarding paths between a source and one or more destinations is through path discovery according to an Ad hoc On-demand Distance Vector, AODV, such as specified in Request for Comments, RFC, 3561 published by Internet Engineering Task Force, IETF. AODV can determine unicast routes to destinations within an ad hoc network with quick adaptation to dynamic link conditions, while requiring relatively low processing and memory overhead and low network utilization. In addition, AODV uses destination sequence numbers to facilitate freedom from loops, even after anomalous delivery of routing control messages.

More specifically, AODV methods establish paths by means of Path Request, also referred to as "Route Request", messages flooded by the originator and Path Reply, also referred to as "Route Reply", messages unicast back by the destination. Intermediate relays that receive the Path Reply message store path information in a forwarding table and are entitled to forward packets. Sequence numbers, also referred to as "forwarding numbers", increase with each new Path Request message and, as such, can be used to distinguish new Path Request messages from copies of Path Request messages already forwarded in the network.

Ultimately, AODV selects a single path between source and destination nodes. However, due to the intrinsically lossy medium-access techniques used in Bluetooth mesh and the low duty cycle of the underlying BLE radios, used to reduce energy consumption, a single path may not be sufficient to maintain a guaranteed successful reception rate.

SUMMARY

Embodiments of the present disclosure provide specific improvements to communication between nodes in a wireless mesh network, such as by providing novel techniques for establishing multiple, or redundant, independent paths between a source node and a destination node via a plurality of intermediate nodes in the mesh network. In this manner, embodiments can increase redundancy and/or reliability, for example when compared to the existing single-path Ad-hoc On-demand Distance Vector, AODV, discovery when used in mesh networks such as Bluetooth mesh networks, such that the likelihood of successful message delivery towards a destination improves without generating additional interference.

Some exemplary embodiments of the present disclosure include methods and/or procedures for establishing redundant paths between a source node and a destination node in a wireless mesh network that also comprises a plurality of intermediate nodes. The exemplary method and/or procedure can be performed by a source node such as a user equipment, wireless device, Internet of Things, IoT, device, Bluetooth Low-Energy, BLE, device, etc. or a component thereof in the wireless mesh network, for example, a Bluetooth mesh network.

The exemplary methods and/or procedures can include establishing a first path between the source node and the destination node, wherein the first path is associated with a first sequence number and comprises one or more first intermediate nodes. The exemplary methods and/or procedures can also include determining to establish a second path between the source node and the destination node. For example, the second path can be redundant to but independent from the first path. The exemplary methods and/or procedures can also include transmitting a path request to a plurality of nodes in the wireless mesh network. The path request can identify the destination node and that the requested second path is redundant to the first path, and is transmitted no earlier than a predetermined duration after the first path is established. For example, the predetermined duration can be a path discovery timeout.

The exemplary methods and/or procedures can also include receiving, from the destination node, a path reply that identifies the second path, which can comprise one or more second intermediate nodes. Moreover, the one or more second intermediate are exclusive of the one or more first intermediate nodes. In this manner, the second path can be redundant to but independent from the first path. In some embodiments, the path reply identifies the second path based on the first sequence number.

Other exemplary embodiments of the present disclosure include methods and/or procedures for establishing redundant paths between a source node and a destination node in a wireless mesh network that also comprises a plurality of intermediate nodes. The exemplary method and/or procedure can be performed by a destination node, such as a user equipment, wireless device, IoT device, BLE device, etc. or a component thereof, in the wireless mesh network, for example a Bluetooth mesh network.

These exemplary methods and/or procedures can include establishing a first path between the source node and the destination node, wherein the first path is associated with a first sequence number and comprises one or more first intermediate nodes. The exemplary methods and/or procedures can also include receiving, from the source node via one or more of the intermediate nodes, a plurality of path requests to establish a second path between the source node and the destination node. Each of the path requests can identify that the requested second path is redundant to the first path, and each of the path requests can be associated with a candidate second path that is different than the candidate second paths associated with all other of the path requests. Furthermore, all intermediate nodes comprising the respective second candidate paths can be exclusive of the one or more first intermediate nodes. In this manner, a selected second path can be redundant to but independent from the first path.

The exemplary methods and/procedures can also include selecting the second path from among the candidate second paths. In some embodiments, each of the received path requests can further identify the number of intermediate nodes comprising the respective candidate second path, and the second path can be selected based on the minimum number of intermediate nodes. The exemplary methods and/procedures can also include transmitting, to the source node, a path reply that identifies the second path. In some embodiments, the path reply can identify the second path based on the first sequence number. In some embodiments, the path reply can be transmitted to the source node via the intermediate nodes comprising the determined second path.

Other exemplary embodiments include a node such as a user equipment, wireless device, IoT device, BLE device, etc. or a component thereof configured to perform operations corresponding to various ones of the exemplary methods and/or procedures described above. Other exemplary embodiments include non-transitory, computer-readable media storing program instructions that, when executed by at least one processor, configure such nodes to perform operations corresponding to the exemplary methods and/or procedures described above.

These and other objects, features and advantages of the exemplary embodiments of the present disclosure will become apparent upon reading the following detailed description of the exemplary embodiments of the present disclosure.

BRIEF DESCRIPTION OF THE DRAWINGS

FIG. 6 schematically illustrates a method according to the present disclosure.

DETAILED DESCRIPTION

Figure 1:
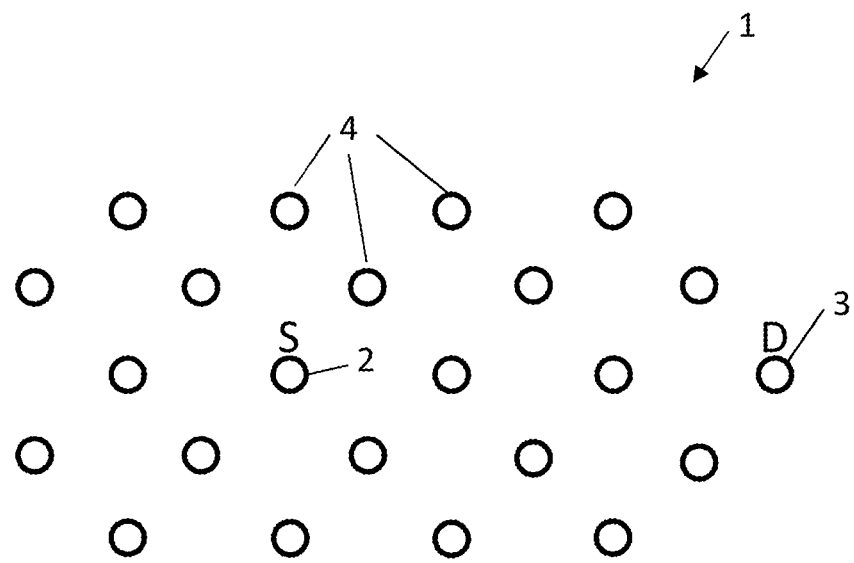
FIG. 1 schematically illustrates a mesh network.

As briefly mentioned above, existing techniques such as Ad-hoc On-demand Distance Vector, AODV, that select a single path between source and destination nodes create various problems when used in Bluetooth mesh networking. For example, due to the intrinsically lossy medium access techniques used in Bluetooth mesh and the low duty cycle, used to reduce energy consumption, of the underlying Bluetooth Low Energy, BLE, radios, the selection of a single path may be insufficient to maintain a guaranteed successful reception rate. This is discussed in more detail below.

For example, it can be useful to have redundancy in the number of paths available between a source-destination pair. Another technique that has been used to establish multiple paths in an ad hoc network is the Equal-Cost Multi-Path, ECMP, algorithm. In ECMP, next-hop packet forwarding to a single destination can occur over multiple "best paths" which tie for top place in routing metric calculations. However, ECMP introduces complex operations at intermediate nodes. All intermediary nodes of a Bluetooth mesh network may not be able to perform such complex operations.

ECMP also has another drawback that makes it unsuitable for Bluetooth mesh. A particular feature of Bluetooth Mesh is that data messages do not contain explicit next-hop indications. As mentioned above, a path is identified by a combination of the addresses of the originator of the path and the address of the destination of the path. As such, multiple nodes that receive a message and belong to the path can forward the message. Since ECMP requires explicit next-hop indication, it is not compatible for use with Bluetooth mesh networks.

Another possibility for establishing multiple paths for Bluetooth Mesh is to allow a destination to send multiple Path Reply messages for a single Path Request. However, it is not easy to construct independent paths since the information about already-established paths is not available at every node in the network. It is very likely that intermediate relay nodes that receive multiple Path Reply messages forward these messages to the same relay to minimize the cost from the originator. As such, any established multiple paths will very likely share the same intermediate links. If relay nodes don't select the relay with the minimum cost for forwarding, the risk is that the redundant path becomes extremely long in term of number of hops.

Accordingly, exemplary embodiments of the present disclosure provide novel techniques to create and/or establish multiple independent paths between two nodes in a Bluetooth Mesh network, while reusing messages and operations already defined for the single path discovery. In this manner, such techniques can increase redundancy and/or reliability, when compared to the existing single-path AODV discovery, when used for message flooding in Bluetooth mesh networks, such that the likelihood of successful message delivery towards a destination improves without increasing the amount of interference generated. Furthermore, such techniques are fully compatible with existing Bluetooth mesh technology, such that a node utilizing these novel techniques can co-exist and/or interoperate with other legacy nodes, in the same Bluetooth mesh network, that do not implement such techniques.

Figure 2:
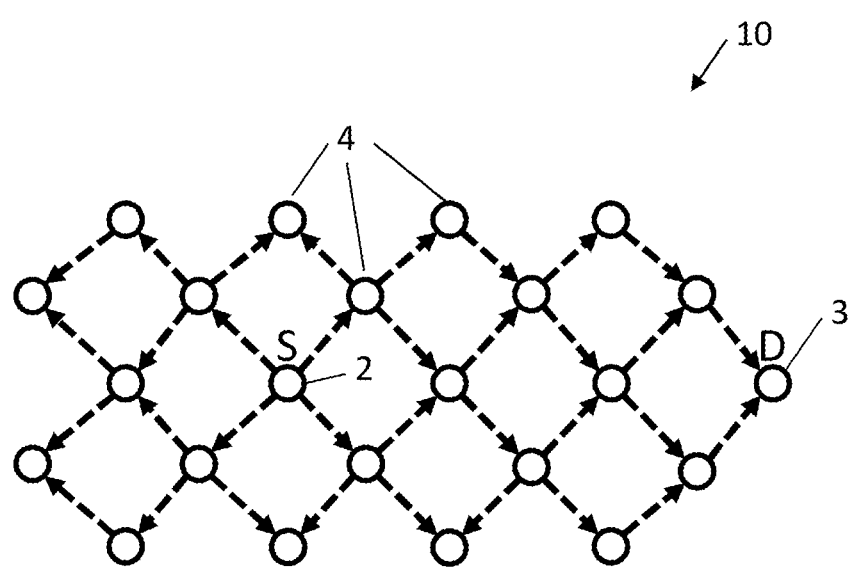
FIG. 2 schematically illustrates flooding in a mesh network FIG. 3 schematically illustrates direct transmission of a message in network.

FIG. 1 illustrates an exemplary mesh network 1 comprising a source node S, 2, a destination node D, 3, and a number of unlabelled relay nodes, 4. FIG. 2 illustrates operation of the exemplary mesh network shown in FIG. 1 when it is used for message flooding such as, e.g., in a Bluetooth mesh network. As can be seen in FIG. 2, there are multiple copies of the message reaching the destination D, thereby increasing the chance of successful reception by D via this redundancy. However, the redundant messages also risk colliding with each other when transmitted on the shared medium, such as a radio channel. This risk of collision counters the positive effects of the redundancy and lowers the chances of a successful delivery. Furthermore, the message will be forwarded in all directions, regardless of where the destination is located.

Figure 3:
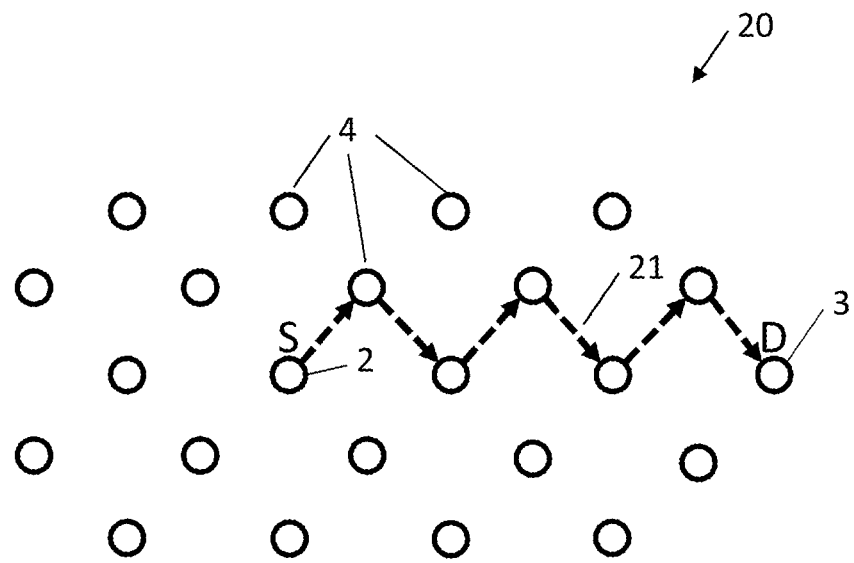

FIG. 3 illustrates operation of the exemplary mesh network shown in FIG. 1 when the message is transmitted over a single path, 21. In FIG. 3, the exemplary path, 21 includes intermediate relay nodes between source S and destination D. The exemplary path can be established, e.g., using AODV-type path discovery. Since only selected relays along the path forward the message, the chances of collisions on the shared medium can be significantly reduced. Even so, due to the lack of redundancy, it becomes more important for each relay along the path to successfully transmit and/or receive the message, thus leaving the path very vulnerable to relay device conditions such as being moved and/or being occupied with other transmissions/receptions.

Figure 4:
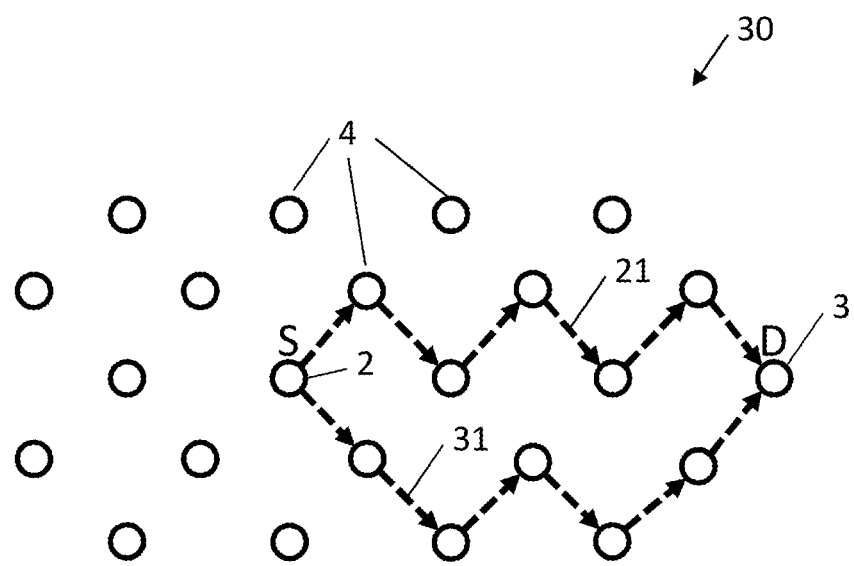
FIG. 4 schematically illustrates redundant paths in a mesh network determined according to the present disclosure.

FIG. 4 illustrates operation of the exemplary mesh network shown in FIG. 1 according to exemplary embodiments of the present disclosure. As shown in FIG. 4, the message is transmitted after having set up an additional path, 31 which includes relay nodes, using exemplary techniques described below. In this arrangement, the likelihood of message collision on the medium is relatively low, and the message is only forwarded in the direction of the intended receiver. The resulting path, with redundancy, is relatively resilient to conditions such as failures, unavailability of single relay nodes along the path. According to various exemplary embodiments, the number of redundant paths created can be chosen by the path originator or can be configured for the entire network by the provisioner node.

In some exemplary embodiments, to set up additional paths towards a specific destination, an originator node can transmit a new Path Request, PREQ, message, using the same forwarding number as was used when the initial path was created. Using the same forwarding number for the new request can cause nodes that are already part of the existing path to discard the new request, such that only nodes that are not already part of the existing path will forward the message. In this manner, these different forwarding nodes can create a second path that is independent of the initial path.

In such embodiments, originator node can refrain from sending the second request so long as there is an entry for the path in the discovery table of any of the intermediate nodes. For example, this condition may be determined and/or ensured by waiting, for a time larger than the lifetime of the entry in the discovery table, before sending out the path request with the same forwarding number to create a redundant path. By waiting to transmit the new request until after any relevant discovery table entries have been cleared in the relay nodes, no modification is needed to the behaviour of intermediate nodes. In this manner, nodes utilizing exemplary embodiments can interoperate with legacy nodes in a single Bluetooth mesh network.

These various exemplary embodiments can be described, as follows, in the context of the operation of the entire mesh network, such as shown in FIG. 1-4. Initially, an originator node, also referred to herein as a "source node", needing to establish a first path to a destination node sends a path request message with a newly generated forwarding or sequence number. This can occur, for example, if the destination node is previously unknown to the source node.

The format of an exemplary a path request message may correspond to a Route Request, RREQ, message used in the AODV routing protocol specified in Request for Comments, RFC, 3561 published by the Internet Engineering Task Force, IETF. In a format, the source node generates the new sequence number and inserts it into the "Originator Sequence Number" field of the path request message, filling other message fields as needed with relevant values.

The first path request is received by the destination node after being forwarded by one or more intermediate nodes, with each forwarding node incrementing the "hop count" value. Thus, when the path request reaches the destination node, the "hop count" represents the distance in hops between the source and destination nodes. Furthermore, due to the mesh topology, the destination node can receive multiple version of the same path request, each version having traversed a different path of intermediate nodes. Subsequently, a first path is established by the destination node transmitting a path reply back to the originator via the best path, which can be selected by the destination node in various ways. For example, the destination node can select the best path based on which of the received path requests includes the lowest "hop count" value.

When intermediate nodes in the "best path" receive this path reply, they store the corresponding path information, including the forwarding or sequence number, in their respective forwarding tables. The format of an exemplary path reply message may correspond to a Route Reply, RREP, message used in the AODV routing protocol specified in RFC 3561. In such a format, the "destination sequence number" can correspond to the sequence number of the path request message, such that intermediate nodes receiving the path reply can correlate it with the earlier received path request. Like the path request message discussed above, intermediate nodes along the "best path" increment the "hop count" value when forwarding the path reply message.

Ultimately, the source node receives this path reply and stores the information about the first path to the destination node in its routing table. After waiting at least a predetermined duration after receiving the path request, also referred to as a "path discovery timeout", intermediate nodes that did not receive a corresponding path reply will discard related information that was temporarily stored in their respective routing tables. For example, intermediate nodes that are not part of the "best path" will discard such information.

The source node then determines that it needs to establish a second path to the destination node, one that is redundant to, but independent from the first path i.e. the selected "best path". After waiting at least the predetermined duration—so as to allow the non-first-path intermediate nodes to discard the information—the source node sends a second path request message, but instead of incrementing the forwarding number, it inserts the same forwarding number into the appropriate field of this message.

The source node sends the second path request to all intermediate nodes to which it is connected. The receiving intermediate nodes that are part of the first established path recognize the forwarding number in their forwarding tables and, consequently, do not participate in the Path Discovery for this second path request (i.e., they do not forward the second path request). However, other intermediate nodes that are not part of the first path (including, e.g., the nodes that discarded the information pertaining to the initial path request) will forward the second path request.

The destination node ultimately receives the second path request after it is forwarded by one or more intermediate nodes, with each forwarding node incrementing the "hop count" value. Due to the mesh topology, the destination node can receive multiple version of the second path request, each version having traversed a different path of intermediate nodes. Even so, these different paths do not include the nodes comprising the first established path.

When the destination node detects that the sequence number in one or more received second path requests matches the sequence number associated with the established first path, it does not discard these second path requests per conventional operation. Rather, the destination node recognizes the second path requests as being for a redundant path to the first established path. Subsequently, a second path is established by the destination node transmitting a second path reply back to the originator via a second "best path" selected from among the paths associated with the received second path requests. This second path can be selected in a similar manner as the first path.

Note that the intermediate nodes comprising the first path will not receive this second path reply, since the selected second path excludes the intermediate nodes comprising the first path (which did not participate in the second path discovery). When intermediate nodes in the second path receive this path reply, they store the corresponding path information, including the forwarding or sequence number, in their respective forwarding tables. Ultimately, the source node receives this second path reply and stores the information about the second path to the destination node in its routing table. As such, the source has now established two redundant but independent paths to the destination node. However, embodiments are not limited to establishing one redundant path; the exemplary operations described above can be repeated as necessary and or desired to establish any number of redundant paths, limited only by the size and topology of the underlying wireless mesh network.

In some alternative embodiments, the source (or originator) node can use a reserved field in the Path Request message (e.g., a different Opcode or an optional field in the header) to indicate whether the path discovery is associated with a first path or with a second, redundant path. When the source node indicates a path discovery for a redundant path in this manner, intermediate (or relay) nodes that are part of the first path established recognize (from the value in the reserved field of the message) that the request is associated with a path that is redundant to a path already in their forwarding table, and do not participate in the Path Discovery for the redundant path. Note that these alternative embodiments can be used independent of, or in combination with, the other exemplary embodiments that included a previously-used forwarding (or sequence) number in the path request, as described above.

Figure 5:
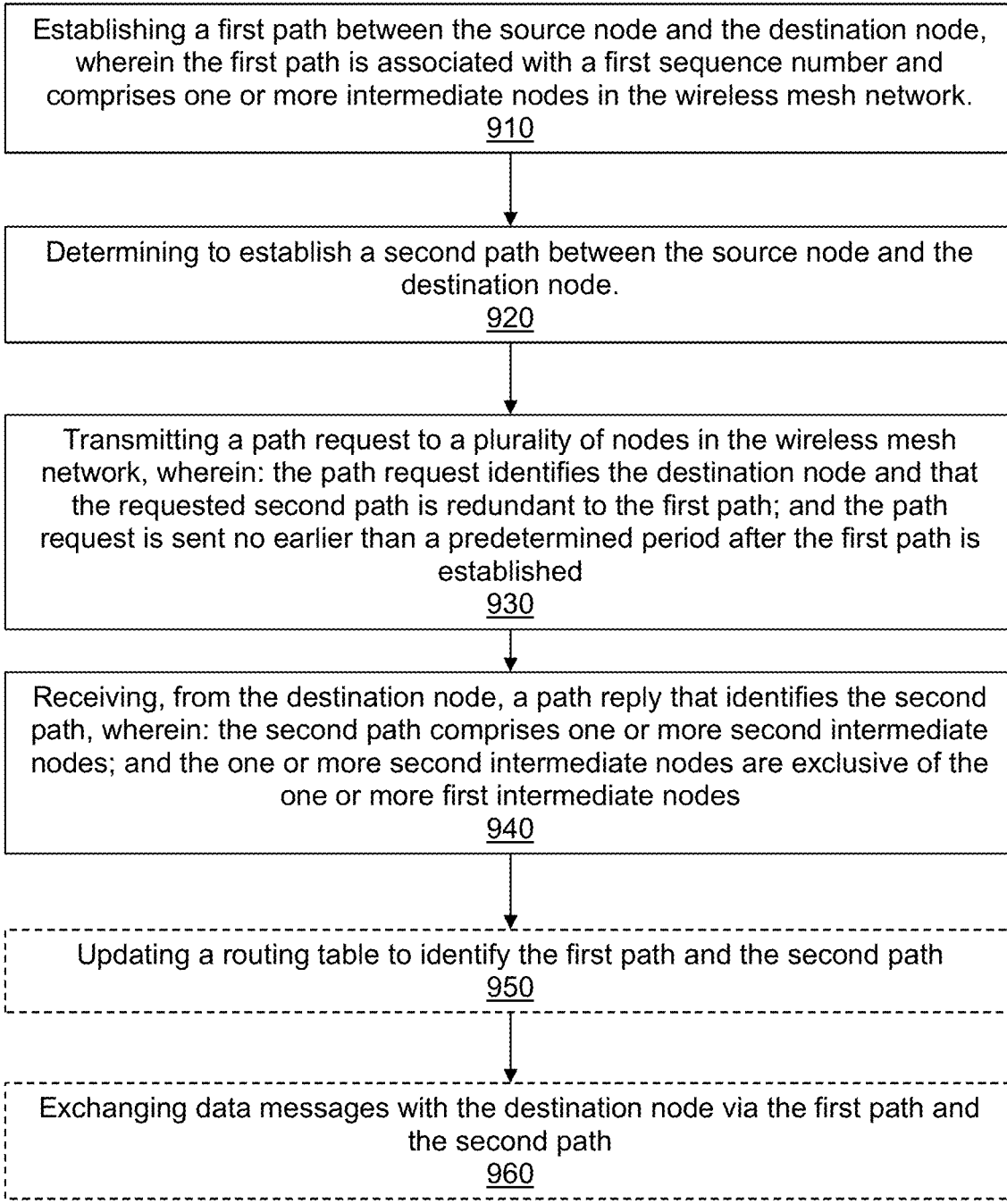
FIG. 5 schematically illustrates a method according to the present disclosure.

FIG. 5 shows a flow diagram of an exemplary method and/or procedure for establishing redundant paths between a source node and a destination node in a wireless mesh network that also comprises a plurality of intermediate nodes. The exemplary method and/or procedure can be performed by a source node (e.g., user equipment, wireless device, IoT device, Bluetooth Low-Energy device, etc. or component thereof) in the wireless mesh network (e.g., a Bluetooth mesh network). For example, the exemplary method and/or procedure shown in FIG. 5 can be implemented, for example, in a node such as a source node. Furthermore, the exemplary method and/or procedure shown in FIG. 5 can be utilized cooperatively with the exemplary method and/or procedures shown in other figures (including but not limited to FIG. 6) to provide various exemplary benefits described herein. In addition, although FIG. 5 shows blocks in a particular order, this order is merely exemplary, and the operations of the exemplary method and/or procedure can be performed in a different order than shown in FIG. 5 and can be combined and/or divided into blocks having different functionality. Optional blocks or operations are shown by dashed lines.

Exemplary embodiments of the method and/or procedure illustrated in FIG. 5 can include the operations of block 910, where the source node can establish a first path between the source node and the destination node, wherein the first path is associated with a first sequence number and comprises one or more first intermediate nodes. The exemplary method and/or procedure can also include operations of block 920, where the source node can determine to establish a second path between the source node and the destination node. For example, the second path can be redundant to but independent from the first path.

The exemplary method and/or procedure can also include operations of block 930, in which the source node can transmit a path request to a plurality of nodes in the wireless mesh network. The path request can identify the destination node and that the requested second path is redundant to the first path, and is transmitted no earlier than a predetermined duration after the first path is established. For example, the predetermined duration can be a path discovery timeout.

The exemplary method and/or procedure can also include operations of block 940, in which the source node can receive, from the destination node, a path reply that identifies the second path, which can comprise one or more second intermediate nodes. Moreover, the one or more second intermediate are exclusive of the one or more first intermediate nodes. In this manner, the second path can be redundant to but independent from the first path. In some embodiments, the path reply identifies the second path based on the first sequence number.

In some embodiments, the exemplary method and/or procedure can also include operations of block 950, in which the source node can update a routing table to identify the first path and the second path. In some embodiments, the exemplary method and/or procedure can also include operations of block 960, in which the source node can exchange data messages with the destination node via the first path and the second path.

In some embodiments, the path request identifies that the requested second path is redundant to the first path based on a sequence number field comprising the first sequence number. In some embodiments, the path request identifies that the requested second path is redundant to the first path based on a field, other than a sequence number field, comprising a particular value. For example, the field other than a sequence number field can be a reserved field.

In some embodiments, the path request comprises an Ad hoc On-Demand Distance Vector, AODV, Route Request, RREQ, message, and the path reply comprises an AODV Route Reply, RREP, message. In some embodiments, the wireless mesh network is a Bluetooth mesh network, and the exemplary method and/or procedure is performed by a Bluetooth Low-Energy node.

FIG. 6 shows a flow diagram of an exemplary method and/or procedure for establishing redundant paths between a source node and a destination node in a wireless mesh network that also comprises a plurality of intermediate nodes. The exemplary method and/or procedure can be performed by a destination node such as a user equipment, wireless device, IoT device, Bluetooth Low-Energy device, etc. or component thereof in the wireless mesh network, for example a Bluetooth mesh network. For example, the exemplary method and/or procedure shown in FIG. 6 can be implemented in a node such as a destination node. Furthermore, as explained below, the exemplary method and/or procedure shown in FIG. 6 can be utilized cooperatively with exemplary method and/or procedures shown in other figures, including but not limited to FIG. 5, to provide various exemplary benefits described herein. In addition, although FIG. 6 shows blocks in a particular order, this order is merely exemplary, and the operations of the exemplary method and/or procedure can be performed in a different order than shown in FIG. 6 and can be combined and/or divided into blocks having different functionality. Optional blocks or operations are shown by dashed lines.

Exemplary embodiments of the method and/or procedure illustrated in FIG. 6 can include the operations of block 1010, in which the destination node can establish a first path between the source node and the destination node, wherein the first path is associated with a first sequence number and comprises one or more first intermediate nodes. The exemplary method and/procedure can also include the operations of block 1020, in which the destination node can receive, from the source node via one or more of the intermediate nodes, a plurality of path requests to establish a second path between the source node and the destination node.

Each of the path requests can identify that the requested second path is redundant to the first path, and each of the path requests can be associated with a candidate second path that is different than the candidate second paths associated with all other of the path requests. Furthermore, all intermediate nodes comprising the respective second candidate paths can be exclusive of the one or more first intermediate nodes. In this manner, a selected second path can be redundant to but independent from the first path.

The exemplary method and/procedure can also include the operations of block 1030, in which the destination node can select the second path from among the candidate second paths. In some embodiments, each of the received path requests can further identify the number of intermediate nodes comprising the respective candidate second path, and the second path can be selected based on the minimum number of intermediate nodes.

The exemplary method and/procedure can also include the operations of block 1040, in which the destination node can transmit, to the source node, a path reply that identifies the second path. In some embodiments, the path reply can identify the second path based on the first sequence number. In some embodiments, the path reply can be transmitted to the source node via the intermediate nodes comprising the determined second path.

In some embodiments, the exemplary method and/or procedure can also include operations of block 1050, in which the destination node can update a routing table to identify the first path and the second path. In some embodiments, the exemplary method and/or procedure can also include operations of block 1060, in which the destination node can exchange data messages with the source node via the first path and the second path.

In some embodiments, each of the path requests identifies that the requested second path is redundant to the first path based on a sequence number field comprising the first sequence number. In some embodiments, each of the second path requests identifies that the requested second path is redundant to the first path based on a field, other than a sequence number field, comprising a particular value. For example, the field other than a sequence number field can be a reserved field.

In some embodiments, each of the path requests comprises an Ad hoc On-Demand Distance Vector, AODV, Route Request, RREQ, message, and the path reply comprises an AODV Route Reply, RREP, message. In some embodiments, the wireless mesh network is a Bluetooth mesh network, and the exemplary method and/or procedure is performed by a Bluetooth Low-Energy node.

Figure 7:
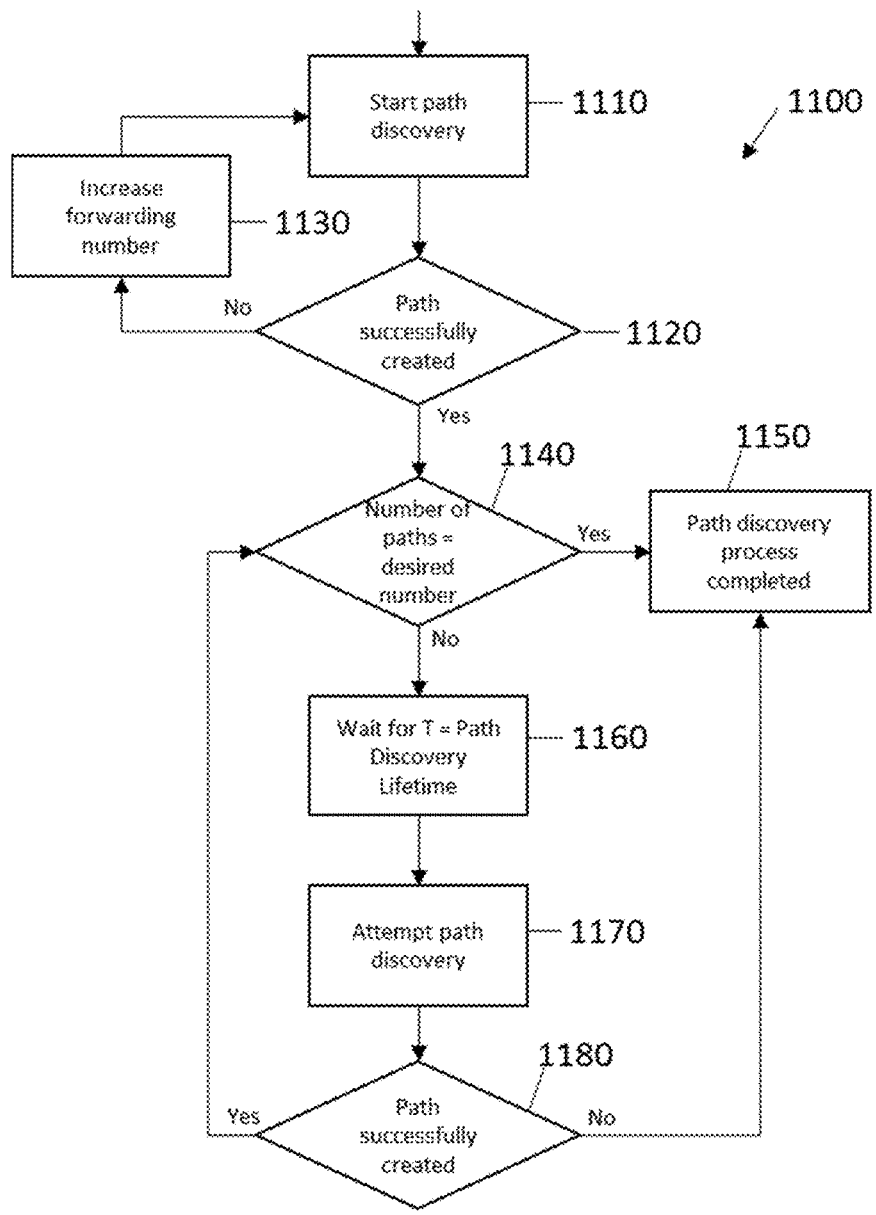
FIG. 7 schematically illustrates a method according to the present disclosure.

FIG. 7 shows a flow diagram of an exemplary method and/or procedure for establishing redundant paths between a source node and a destination node in a wireless mesh network that also comprises a plurality of intermediate nodes. For example, the method and/procedure shown in FIG. 7 can be viewed as further illustrating the exemplary method and/or procedure shown in FIG. 5. Similar to FIG. 5, the exemplary method and/or procedure shown in FIG. 7 can be performed by a source node (e.g., user equipment, wireless device, IoT device, Bluetooth Low-Energy device, etc. or component thereof) in the wireless mesh network (e.g., a Bluetooth mesh network). For example, the exemplary method and/or procedure shown in FIG. 7 can be implemented in a source or a destination node.

Furthermore, the exemplary method and/or procedure shown in FIG. 7 can be utilized cooperatively with the exemplary method and/or procedures shown in other figures (including but not limited to FIG. 8) to provide various exemplary benefits described herein. In addition, although FIG. 7 shows blocks in a particular order, this order is merely exemplary, and the operations of the exemplary method and/or procedure can be performed in a different order than shown in FIG. 7 and can be combined and/or divided into blocks having different functionality.

The exemplary method and/or procedure can include operations of block 1110, where the source node can start path discovery to determine an initial path to a destination node, using an initial forwarding or sequence number. In the operations of block 1120, the source node determines if an initial path was successfully established and/or created. If this determination is negative, operation proceeds to block 1130, where the source node increments the sequence number and returns to block 1110 to try again. Otherwise, if the determination is positive ("Yes"), operation proceeds to block 1140 where the source node determines if the desired number of paths have been created. For example, in block 1140, the source node can determine if a second redundant path should be created.

If the determination in block 1140 is positive ("Yes"), the path discovery process is complete (block 1150). Otherwise, if the determination in block 1150 is negative ("No", i.e., more paths should be created), operation proceeds to block 1160, where the source node waits for a predetermined duration, labelled here as a path discovery lifetime. After waiting in this manner, operation proceeds to block 1170, where the source node attempts discovery of an additional (e.g., second) path to the destination node. This can be done in the manner discussed above, such as in relation to FIG. 5.

Operation then proceeds to block 1180, where it is determined whether the additional path was successfully established and/or created. If the determination is positive ("Yes"), operation proceeds to block 1140, where it is again determined whether additional paths are required and/or desired. If the determination in block 1180 is negative ("No"), the path discovery process is complete (block 1150).

Figure 8:
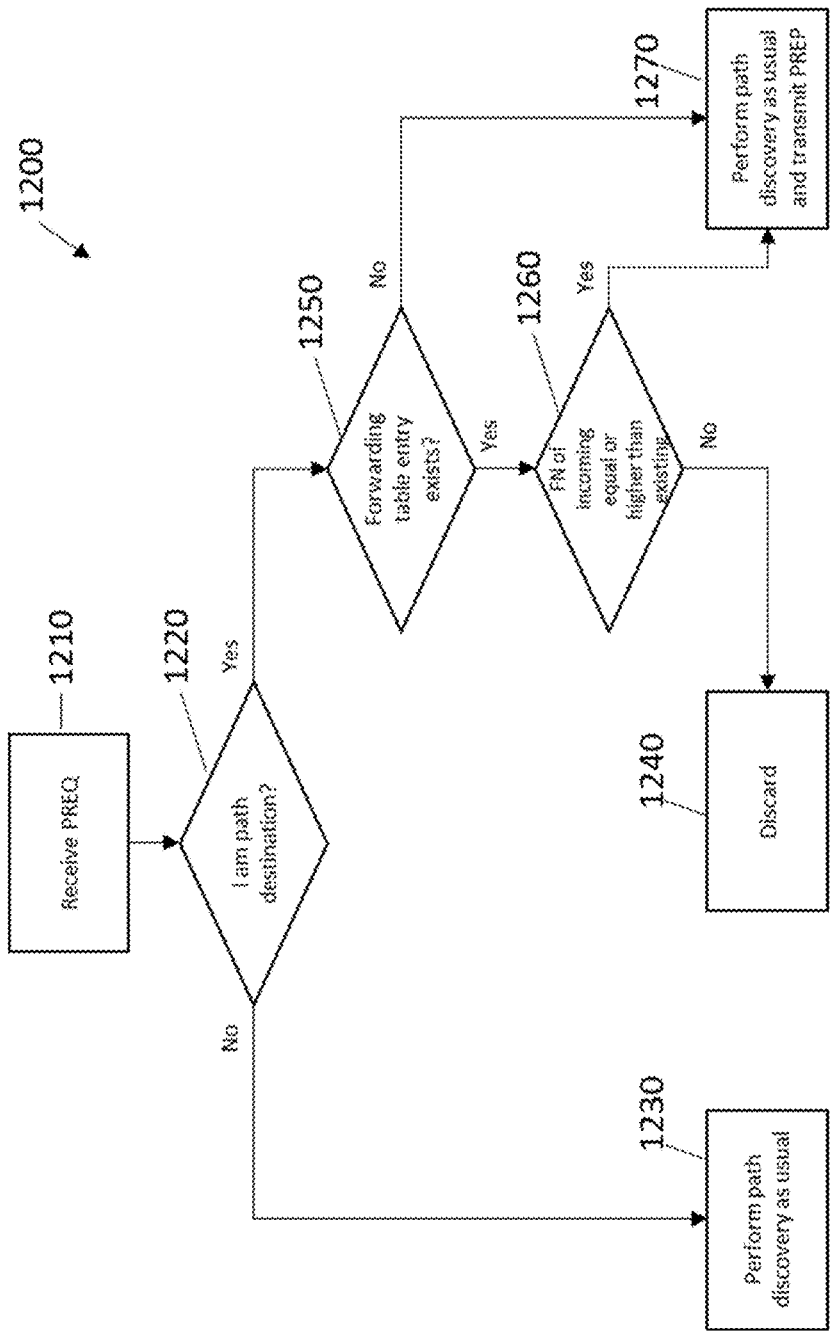
FIG. 8 schematically illustrates a method according to the present disclosure.

FIG. 8 shows a flow diagram of an exemplary method and/or procedure for establishing redundant paths between a source node and a destination node in a wireless mesh network that also comprises a plurality of intermediate nodes. For example, the method and/procedure shown in FIG. 8 can be viewed as further illustrating the exemplary method and/or procedure shown in FIG. 6. Similar to FIG. 6, the exemplary method and/or procedure shown in FIG. 8 can be performed by a node (e.g., user equipment, wireless device, IoT device, Bluetooth Low-Energy device, etc. or component thereof) that receives a path request from a source node in the wireless mesh network (e.g., a Bluetooth mesh network). For example, the exemplary method and/or procedure shown in FIG. 8 can be implemented, for example, in source or a destination node.

Furthermore, the exemplary method and/or procedure shown in FIG. 8 can be utilized cooperatively with the exemplary method and/or procedures shown in other figures (including but not limited to FIG. 7) to provide various exemplary benefits described herein. In addition, although FIG. 8 shows blocks in a particular order, this order is merely exemplary, and the operations of the exemplary method and/or procedure can be performed in a different order than shown in FIG. 8 and can be combined and/or divided into blocks having different functionality.

The exemplary method and/or procedure can include operations of block 1210, where the node can receive a path request from a source node. The path request can include a destination address, which the node can compare to its own address in block 1220. If no match is determined ("No"), the node is an intermediate node rather than the destination for the path request, and operation proceeds to block 1230 where path discovery can be performed in a conventional manner. On the other hand, if a match is determined ("Yes"), the node is the destination node for the path request, and operation proceeds to block 1250, where the node determines whether an entry corresponding to the path request already exists in the node's forwarding table. If the determination is positive ("Yes"), operation proceeds to block 1260 where the node further determines whether the forwarding (or sequence) number included in the path request is greater than or equal to the forwarding number associated with the corresponding entry of the node's forwarding table, according to exemplary embodiments discussed above. If the determination is negative ("No"), operation proceeds to block 1240 where the node discards the received path request.

On the other hand, if the determination in block 1260 is positive ("Yes") or the determination in block 1250 is negative ("No", i.e., no corresponding table entry exists), operation proceeds to block 1270 where the node performs path discovery, selects a "best path," and transmits a path reply to the source node via the selected path.

Figure 9:
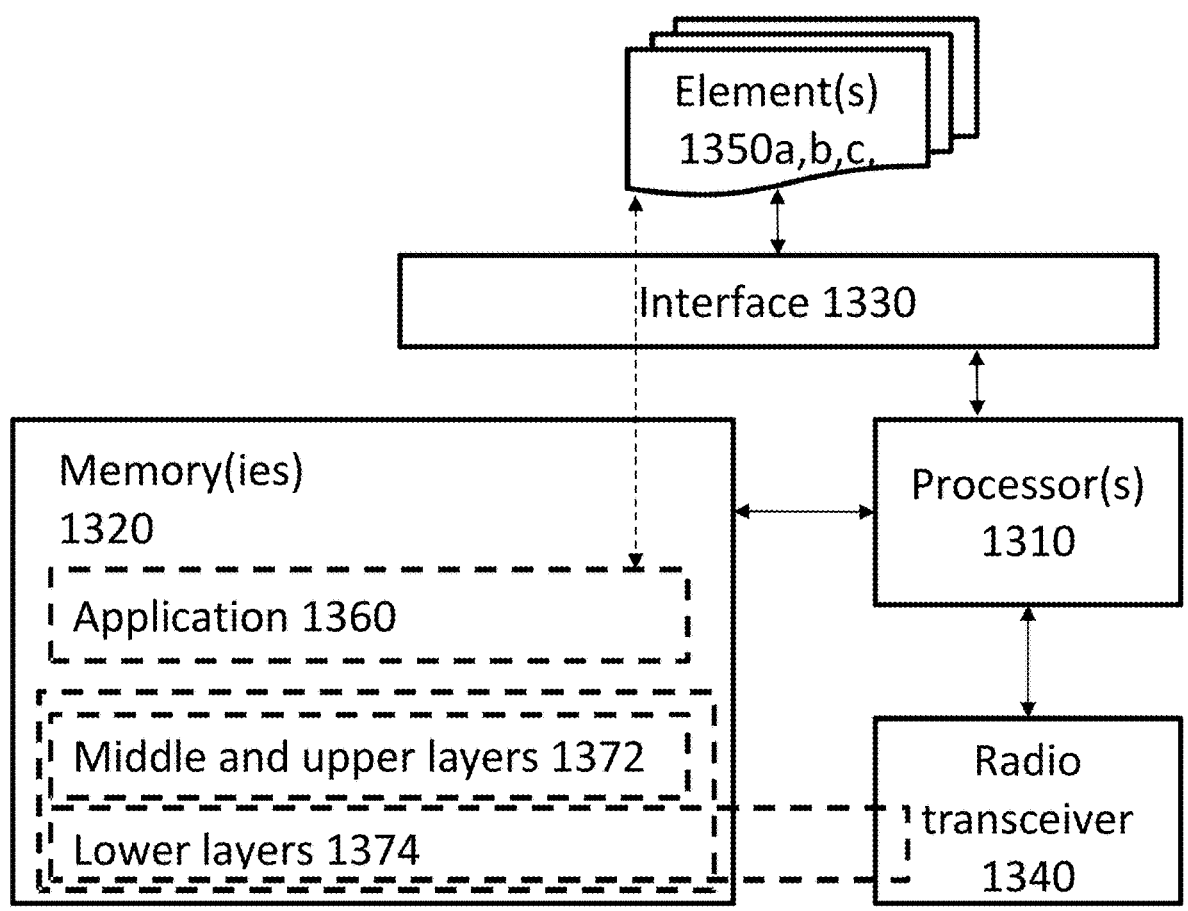
FIG. 9 schematically illustrates a node device in wireless mesh network arranged to execute a method according to the present disclosure.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 9 shows a block diagram of an exemplary wireless mesh device or node 1300 according to various embodiments of the present disclosure. For example, exemplary node 1300 can be configured by execution of instructions, stored on a computer-readable medium, to perform operations corresponding to one or more of the exemplary methods and/or procedures described above.

Exemplary node 1300 can comprise one or more processors 1310 that can be operably connected to one or more memories 1320 via address and data buses, serial ports, or other methods and/or structures known to those of ordinary skill in the art. Memory(ies) 1320 comprises software code or programs executed by processor(s) 1310 that facilitates, causes and/or programs exemplary node 1300 to perform various operations.

As shown in FIG. 9, memory(ies) 1320 can include an application 1360 (e.g. application code) and a mesh networking protocol stack 1370, which can further comprise middle and upper layers 1372 and lower layers 1374. For example, protocol stack 1370 can comprise a Bluetooth mesh networking protocol stack, such as shown in FIGS. 1 and 2 and described in more detail above. In such case, the lower layers 1374 can include the BLE PHY and link layers, with the remainder of the Bluetooth mesh networking protocol stack comprising middle and upper layers 1372. Furthermore, protocol stack 1370 can include software code that, when executed by processor(s) 1310, configures node 1300 to perform any of the exemplary methods and/or procedures described above, including those shown in FIG. 3-8.

In some embodiments, memory(ies) 1320 and processor(s) 1310 can be subdivided into multiple processors and memories such that a particular memory stores code for lower layers 1374 that is executed by a particular processor, and a further memory stores code for middle and upper layers 1372 that is executed by a further processor. For example, in Bluetooth mesh networking embodiments, the particular memory and particular processor can operate as a Bluetooth device or controller while the further memory and further processor can operate as a Bluetooth host, with a host-controller interface (HCI) between the two.

Exemplary node 1300 also includes a radio transceiver 1340 that is coupled to and communicates with processor 1310. Radio transceiver 1340 includes a transmitter and receiver operable (e.g., in conjunction with processor 1310) to transmit and receive wireless signals at a particular frequency or band of frequencies. In Bluetooth mesh networking embodiments, radio transceiver 1340 can be configured to transmit and receive according to the BLE standard in the 2.4-GHz ISM band. In some embodiments, radio transceiver 1340 can comprise portions of lower layers 1374, as illustrated in FIG. 9. For example, in Bluetooth mesh network embodiments, the BLE physical layer can be implemented by radio transceiver 1340 in combination with software code executed by processor 1310. Furthermore, although not shown, radio transceiver 1340 can include one or more antennas that facilitate transmission and reception in the appropriate frequency band.

In some embodiments, node 1300 can also include one or more element(s) 1350*a*, 1350*b*, 1350*c*, etc. that can provide an interface with the physical environment in which node 1300 is located. For example, element(s) 1350 can monitor and/or collect data related to operation of a physical process or machine. As another example, element(s) 1350 can control one or more aspects of such a physical process. As such, it can be desirable to transmit the collected data to and/or receive control commands from a remote source via the mesh networking functionality of node 1300.

This can be done, for example, by application 1360 which can communicate with both mesh networking stack 1370 and the element(s) 1350. This logical communication between application 1360 and element(s) 1350 is illustrated in FIG. 9 as a dashed line. In some embodiments, however, the physical communication (illustrated by solid lines) between application 1360 and element(s) 1350 can be performed via an interface circuit 1330 interposed between element(s) 1350 and processor(s) 1310.

As described herein, device, node, and/or apparatus can be represented by a semiconductor chip, a chipset, or a (hardware) module comprising such chip or chipset; this, however, does not exclude the possibility that a functionality of a device, node, or apparatus, instead of being hardware implemented, be implemented as a software module such as a computer program or a computer program product comprising executable software code portions for execution or being run on a processor. Furthermore, functionality of a device, node, or apparatus can be implemented by any combination of hardware and software. A device, node, or apparatus can also be regarded as an assembly of multiple devices and/or apparatuses, whether functionally in cooperation with or independently of each other. Moreover, devices, nodes, and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated clauses:

Clause 1. A method for establishing redundant paths between a source node and a destination node in a wireless mesh network, said method comprising the steps of:
  establishing a first path between said source node and said destination node, wherein said first path is associated with a first sequence number and comprises one or more first intermediate nodes in said wireless mesh network;
  determining to establish a second path between said source node and said destination node;
  transmitting a path request to a plurality of nodes in said wireless mesh network, wherein said path request identifies said destination node and that said requested second path is redundant to said first path; and said path request is, preferably, not necessarily, transmitted no earlier than a predetermined duration after said first path is established;
  receiving, from said destination node, a path reply that identifies said second path, wherein said second path comprises one or more second intermediate nodes, and wherein said one or more second intermediate are exclusive of said one or more first intermediate nodes.

It is noted that it may also be possible that the step of transmitting said path request to a plurality of nodes in said wireless mesh network, wherein said path request identifies said destination node and that said requested second path is redundant to said first path, wherein said path request is transmitted triggered by receiving a path reply that identified the first path.

Clause 2. The method according to clause 2, wherein said path request identifies that said requested second path is redundant to said first path based on a sequence number field comprising said first sequence number.

Clause 3. The method according to clause 2, wherein said path reply identifies said second path based on said first sequence number.

Clause 4. The method according to clause 1, wherein said path request identifies that said requested second path is redundant to said first path based on a field, other than a sequence number field, comprising a particular value.

Clause 5. The method according to any of clauses 1-4, wherein said path request comprises an Ad hoc On-Demand Distance Vector, AODV, Route Request, RREQ, message; and said path reply comprises an AODV Route Reply, RREP, message.

Clause 6. The method according to any of clauses 1-5, wherein said wireless mesh network is a Bluetooth mesh network, and said method is performed by a Bluetooth Low-Energy node.

Clause 7. The method according to any of clauses 1-6, further comprising: updating a routing table to identify said first path and said second path.

Clause 8. The method according to any of clauses 1-7, further comprising exchanging data messages with said destination node via said first path and said second path.

Clause 9. A method for establishing redundant paths between a source node and a destination node in a wireless mesh network that also comprises a plurality of intermediate nodes, said method comprising:
  establishing a first path between said source node and said destination node, wherein said first path is associated with a first sequence number and comprises one or more first intermediate nodes;
  receiving, from said source node via one or more of said intermediate nodes, a plurality of path requests to establish a second path between said source node and said destination node, wherein each of said path requests identifies that said requested second path is redundant to said first path; each of said path requests is associated with a candidate second path that is different than said candidate second paths associated with all other of the path requests; and all intermediate nodes comprising said respective second candidate paths are exclusive of said one or more first intermediate nodes;
  selecting said second path from among said candidate second paths; and transmitting, to said source node, a path reply that identifies said second path.

Clause 10. The method according to clause 9, wherein each of said path requests identifies that said requested second path is redundant based on a sequence number field comprising said first sequence number.

Clause 11. The method according to clause 10, wherein said path reply identifies said second path based on said first sequence number.

Clause 12. The method according to clause 9, wherein each of said path requests identifies that said requested second path is redundant to said first path based on a field, other than a sequence number field, comprising a particular value.

Clause 13. The method according to any of clauses 9-12, wherein said path reply is transmitted to said source node via said intermediate nodes comprising said determined second path.

Clause 14. The method according to any of clauses 9-13, wherein each of said received path requests further identifies said number of intermediate nodes comprising said respective candidate second path; and said second path is selected based on said minimum number of intermediate nodes.

Clause 15. The method according to any of clauses 9-14, wherein each of said received path requests comprises an Ad hoc On-Demand Distance Vector, AODV, Route Request, RREQ, message; and said path reply comprises an AODV Route Reply, RREP, message.

Clause 16. The method according to any of clauses 9-15, wherein said wireless mesh network is a Bluetooth mesh network, and said method is performed by a Bluetooth Low-Energy node.

Clause 17. The method according to any of clauses 9-16, further comprising: updating a routing table to identify said first path and said second path between said source node and said destination node.

Clause 18. The method according to any of clauses 9-17, further comprising exchanging data messages with said source node via said first path and said second path.

Clause 19. A node in a wireless mesh network that includes one or more source nodes, one or more destination nodes, and a plurality of intermediate nodes, wherein said node comprises:

a wireless transceiver; and processing circuitry operatively coupled to said wireless transceiver, the combination being configured to perform operations corresponding to said methods according to any of clauses 1-18.

Clause 20. A non-transitory, computer-readable medium storing computer-executable instructions that, when executed by processing circuitry comprising a node in a wireless mesh network, configure the node to perform operations corresponding to the methods of any of clauses 1-18.

Clause 21. A wireless mesh network comprising:
one or more source nodes, each source node comprising a wireless transceiver and processing circuitry operably coupled and configured to perform operations corresponding to any of said methods according to clauses 1-8;
one or more destination nodes, each destination node comprising a wireless transceiver and processing circuitry operably coupled and configured to perform operations corresponding to any of said methods according to clauses 9-18; and
a plurality of intermediate nodes interconnected in a mesh topology and configured to forward messages between said source node(s) and said destination node(s).

Notably, modifications and other embodiments of the disclosed embodiments will come to mind to one skilled in the art having the benefit of the teachings presented in the foregoing descriptions and the associated drawings. Therefore, it is to be understood that the scope of the disclosure is not to be limited to the specific embodiments disclosed and that modifications and other variants are intended to be included within the scope. Although specific terms can be employed herein, they are used in a generic and descriptive sense only and not for purposes of limitation.

The invention claimed is:

1. A method for establishing redundant paths between a source node and a destination node in a wireless mesh network that also comprises a plurality of intermediate nodes, the method being performed by the destination node and comprising:
establishing a first path between the source node and the destination node, wherein the first path is associated with a first sequence number and comprises one or more first intermediate nodes;
receiving, from the source node via one or more of the intermediate nodes, a plurality of path requests to establish a second path between the source node and the destination node, wherein:
each of the path requests identifies that the requested second path is redundant to the first path,
each of the path requests is associated with a candidate second path that is different than the candidate second paths associated with all other of the path requests, and
all intermediate nodes comprising the respective second candidate paths are exclusive of the one or more first intermediate nodes;
selecting the second path from among the candidate second paths; and
transmitting, to the source node, a path reply that identifies the second path.

2. The method of claim 1, wherein:
the path requests include respective sequence number fields; and
each path request identifies that the requested second path is redundant based on the sequence number field comprising the first sequence number.

3. The method of claim 2, wherein the path reply identifies the second path based on the first sequence number.

4. The method of claim 1, wherein each of the path requests identifies that the requested second path is redundant to the first path based on a particular value in a field of the path request that is not a sequence number field.

5. The method of claim 1, wherein the path reply is transmitted to the source node via the intermediate nodes comprising the selected second path.

6. The method of claim 1, wherein:
the respective path requests further identify respective numbers of intermediate nodes comprising the respective candidate second paths; and
the second path is selected based on the minimum number of intermediate nodes.

7. The method of claim 1, wherein:
each of the received path requests comprises an Ad hoc On-Demand Distance Vector (AODV) Route Request (RREQ) message; and
the path reply comprises an AODV Route Reply (RREP) message.

8. The method of claim 1, wherein:
the wireless mesh network is a Bluetooth mesh network, and
the destination node is a Bluetooth Low-Energy node.

9. The method of claim 1, further comprising updating a routing table to identify the first path and the second path between the source node and the destination node.

10. The method of claim 1, further comprising exchanging data messages with the source node via the first path and the second path.

11. A wireless mesh network comprising:
one or more source nodes, each source node configured to establish redundant paths through the wireless mesh network to one or more destination nodes in the wireless mesh network;
a plurality of intermediate nodes interconnected in a mesh topology and configured to forward messages between the one or more source nodes and the one or more destination nodes; and
the one or more destination nodes, each destination node comprising a wireless transceiver and processing circuitry operably coupled and configured to:
establish a first path between a particular one of the source nodes and the destination node, wherein the first path is associated with a first sequence number and comprises a first one or more of the intermediate nodes;
receive, from the particular source node via one or more of the intermediate nodes, a plurality of path requests to establish a second path between the particular source node and the destination node, wherein:
each of the path requests identifies that the requested second path is redundant to the first path,
each of the path requests is associated with a candidate second path that is different than the candidate second paths associated with all other of the path requests, and
all intermediate nodes comprising the respective second candidate paths are exclusive of the first one or more intermediate nodes;
select the second path from among the candidate second paths; and transmit, to the particular source node, a path reply that identifies the second path.

12. A node configured to operate as a destination node in a wireless mesh network that also includes one or more source nodes and a plurality of intermediate nodes, wherein the destination node comprises:
a wireless transceiver; and
processing circuitry operatively coupled to the wireless transceiver, whereby the processing circuitry and the wireless transceiver are configured to:
establish a first path between a particular one of the source nodes and the destination node, wherein the first path is associated with a first sequence number and comprises one or more first intermediate nodes;
receive, from the particular source node via one or more of the intermediate nodes, a plurality of path requests to establish a second path between the particular source node and the destination node, wherein:
each of the path requests identifies that the requested second path is redundant to the first path,
each of the path requests is associated with a candidate second path that is different than the candidate second paths associated with all other of the path requests, and
all intermediate nodes comprising the respective second candidate paths are exclusive of the one or more first intermediate nodes;
select the second path from among the candidate second paths; and
transmit, to the particular source node, a path reply that identifies the second path.

13. The destination node of claim 12, wherein:
the path requests include respective sequence number fields; and
each path request identifies that the requested second path is redundant based on the sequence number field comprising the first sequence number.

14. The destination node of claim 13, wherein the path reply identifies the second path based on the first sequence number.

15. The destination node of claim 12, wherein each of the path requests identifies that the requested second path is redundant to the first path based on a particular value in a field of the path request that is not a sequence number field.

16. The destination node of claim 12, wherein the path reply is transmitted to the particular source node via the intermediate nodes comprising the selected second path.

17. The destination node of claim 12, wherein:
the respective path requests further identify respective numbers of intermediate nodes comprising the respective candidate second paths; and
the second path is selected based on the minimum number of intermediate nodes.

18. The destination node of claim 12, wherein:
each of the received path requests comprises an Ad hoc On-Demand Distance Vector (AODV) Route Request (RREQ) message; and
the path reply comprises an AODV Route Reply (RREP) message.

19. The destination node of claim 12, wherein:
the wireless mesh network is a Bluetooth mesh network, and
the destination node is a Bluetooth Low-Energy node.

20. The destination node of claim 12, wherein the processing circuitry and the wireless transceiver are further configured to update a routing table to identify the first path and the second path between the particular source node and the destination node.

21. The destination node of claim 12, wherein the processing circuitry and the wireless transceiver are further configured to exchange data messages with the particular source node via the first path and the second path.

* * * * *

UNITED STATES PATENT AND TRADEMARK OFFICE
CERTIFICATE OF CORRECTION

| | |
|---|---|
| PATENT NO. | : 11,743,173 B2 |
| APPLICATION NO. | : 17/263324 |
| DATED | : August 29, 2023 |
| INVENTOR(S) | : Arvidson et al. |

It is certified that error appears in the above-identified patent and that said Letters Patent is hereby corrected as shown below:

On the Title Page

In Item (57), under "ABSTRACT", in Column 2, Lines 1-2, delete "a source node and the destination node, source node and a destination" and insert -- a source node and a destination --, therefor.

On Page 2, in Item (56), under "OTHER PUBLICATIONS", in Column 2, Line 7, delete "Blutooth," and insert -- Bluetooth, --, therefor.

In the Specification

In Column 4, Line 51, delete "and/procedures" and insert -- and/or procedures --, therefor.

In Column 4, Line 58, delete "and/procedures" and insert -- and/or procedures --, therefor.

In Column 5, Lines 16-17, delete "network" and insert -- network, --, therefor.

In Column 5, Lines 17-18, delete "FIG. 3 schematically illustrates direct transmission of a message in network." and insert the same at Line 18, as a new sub-point.

In Column 6, Line 11, delete "term of" and insert -- terms of --, therefor.

In Column 7, Line 35, delete "exemplary a path" and insert -- exemplary path --, therefor.

In Column 8, Line 67, delete "and or" and insert -- and/or --, therefor.

In Column 10, Line 56, delete "and/procedure" and insert -- and/or procedure --, therefor.

In Column 11, Line 3, delete "and/procedure" and insert -- and/or procedure --, therefor.

In Column 11, Line 11, delete "and/procedure" and insert -- and/or procedure --, therefor.

Signed and Sealed this
Thirtieth Day of January, 2024

Katherine Kelly Vidal
*Director of the United States Patent and Trademark Office*

In Column 11, Line 48, delete "and/procedure" and insert -- and/or procedure --, therefor.

In Column 12, Line 36, delete "and/procedure" and insert -- and/or procedure --, therefor.

In Column 13, Line 65, delete "host-controller interface (HCl)" and insert -- host-controller interface (HCI) --, therefor.

In Column 15, Line 5, delete "herein, that there" and insert -- herein, there --, therefor.

In Column 15, Line 45, delete "clause 2," and insert -- clause 1, --, therefor.

In Column 17, Line 23, delete "and" and insert the same at Line 22, after "9-18;" as a continuation sub-point.